US011091215B2

(12) United States Patent
Madau et al.

(10) Patent No.: US 11,091,215 B2
(45) Date of Patent: Aug. 17, 2021

(54) INFINITE ADJUST SEAT POST WITH PRESSURE RELIEF VALVE

(71) Applicant: Fox Factory, Inc., Braselton, GA (US)

(72) Inventors: Barna Madau, Apple Valley, CA (US); Jeremiah Docter, Scotts Valley, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

(21) Appl. No.: 16/580,621

(22) Filed: Sep. 24, 2019

(65) Prior Publication Data
US 2020/0017156 A1    Jan. 16, 2020

Related U.S. Application Data

(63) Continuation of application No. 15/944,584, filed on Apr. 3, 2018, now Pat. No. 10,427,741, which is a (Continued)

(51) Int. Cl.
*B62J 1/08* (2006.01)
*B62J 1/06* (2006.01)
(Continued)

(52) U.S. Cl.
CPC . *B62J 1/08* (2013.01); *B62J 1/06* (2013.01); *F16F 9/34* (2013.01); *F16F 9/512* (2013.01); (Continued)

(58) Field of Classification Search
CPC . F16F 9/56; F16F 9/0245; F16F 9/462; A47C 3/30; A47C 3/40; A47C 1/0242; (Continued)

(56) References Cited

U.S. PATENT DOCUMENTS 5,116,028 A * 5/1992 Mintgen ............... F16F 9/0272
137/599.16
6,382,370 B1   5/2002 Girvin
(Continued)

FOREIGN PATENT DOCUMENTS

EP    2594467 A1   5/2013

OTHER PUBLICATIONS

EP Search Report for European Application No. 16194674.4, dated Feb. 24, 2017, 9 Pages.

*Primary Examiner* — Robert A. Siconolfi
*Assistant Examiner* — San M Aung

(57) ABSTRACT

An assembly for enabling continuous seat post function during extreme conditions is described and includes: a first valve at least partially, slidably disposed within a stationary piston and for controlling a first fluid pathway there through, wherein the first fluid pathway runs from a first portion and to a second portion of the oil chamber, wherein the stationary piston separates the oil chamber into the first portion and the second portion; and a second valve at least partially disposed within the stationary piston and disposed in series with the first valve and having a second fluid pathway disposed through the first valve and the second valve, being in parallel with the first fluid pathway, running from the first portion to the second portion of the oil chamber, and providing a bypass for oil to flow from the first portion to the second portion when the first fluid pathway is closed.

18 Claims, 11 Drawing Sheets

Related U.S. Application Data continuation of application No. 14/887,126, filed on Oct. 19, 2015, now Pat. No. 9,963,181.

(52) U.S. Cl.
CPC .............. *F16F 9/5126* (2013.01); *F16F 9/52* (2013.01); *B62J 2001/085* (2013.01); *F16F 2230/24* (2013.01)

(58) Field of Classification Search
CPC .......... B60N 2/231; B60G 17/005; B62J 1/08; B62J 1/06; B62J 2001/085; B62K 19/36; A61G 5/1059; Y10S 297/03
USPC ..... 188/300, 322.11, 312, 314, 322.14, 281; 267/64.11; 248/157, 161, 404, 631, 599; 297/344.19, 411.36, 195.1, 215.14, 297/215.13; 701/49
See application file for complete search history.

(56) References Cited

U.S. PATENT DOCUMENTS

| | | |
|---|---|---|
| 8,398,104 B2 | 3/2013 | Hsu |
| 9,963,181 B2 | 5/2018 | Madau et al. |
| 2006/0065496 A1 | 3/2006 | Fox |
| 2011/0057485 A1* | 3/2011 | Shirai ........................ B62J 1/08 297/199 |
| 2012/0104727 A1* | 5/2012 | Hsu ........................... B62J 1/08 280/287 |
| 2012/0181126 A1 | 7/2012 | De Kock |
| 2012/0234639 A1 | 9/2012 | Teraoka et al. |
| 2012/0247894 A1* | 10/2012 | Shirai .................... B62K 19/36 188/322.13 |
| 2013/0093231 A1* | 4/2013 | Hsu ........................... B62J 1/06 297/344.19 |
| 2013/0221713 A1* | 8/2013 | Pelot ...................... G05B 15/02 297/215.13 |
| 2015/0034779 A1 | 2/2015 | McAndrews et al. |
| 2015/0191208 A1* | 7/2015 | Hsu ....................... B62K 19/36 403/322.3 |
| 2015/0217829 A1 | 8/2015 | Ericksen et al. |
| 2015/0225030 A1* | 8/2015 | Shirai .................... B62K 19/36 403/27 |
| 2015/0232142 A1* | 8/2015 | Shirai .................... B62K 19/36 403/104 |
| 2018/0222541 A1 | 8/2018 | Madau et al. |

\* cited by examiner

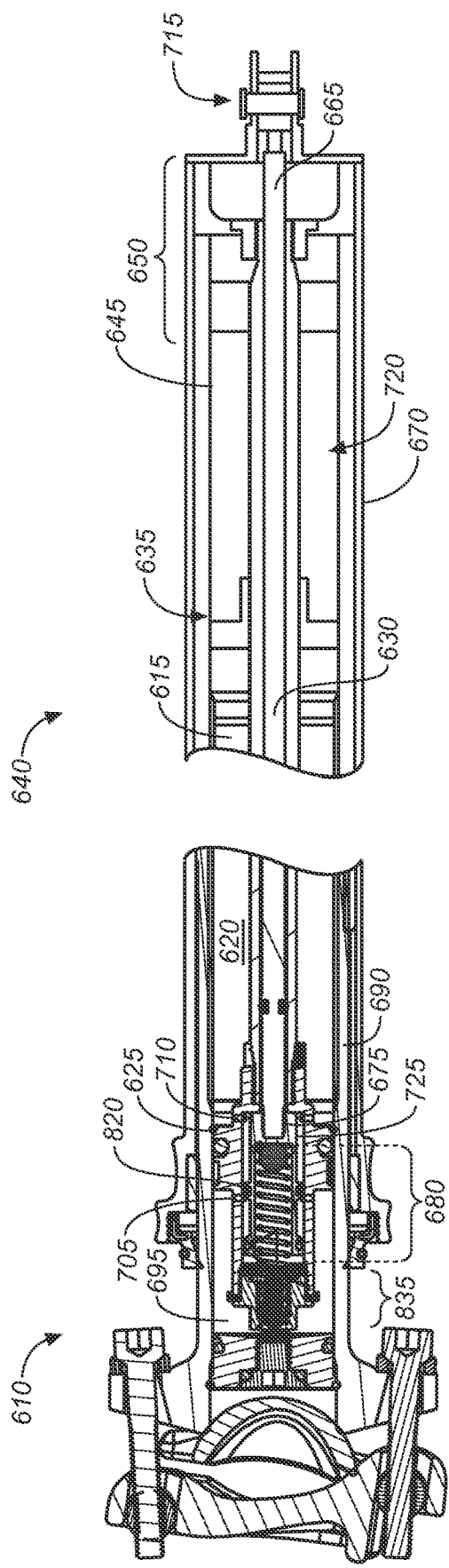
FIG. 7
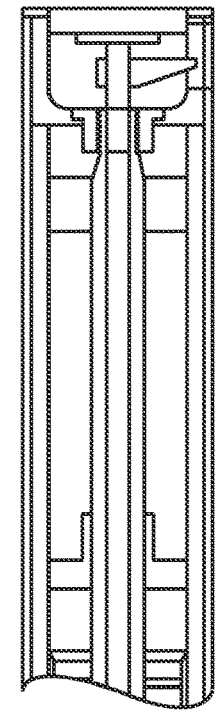
FIG. 9
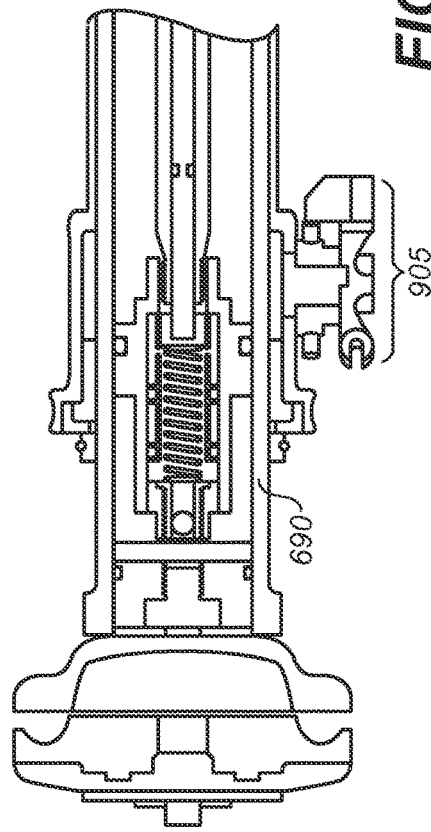

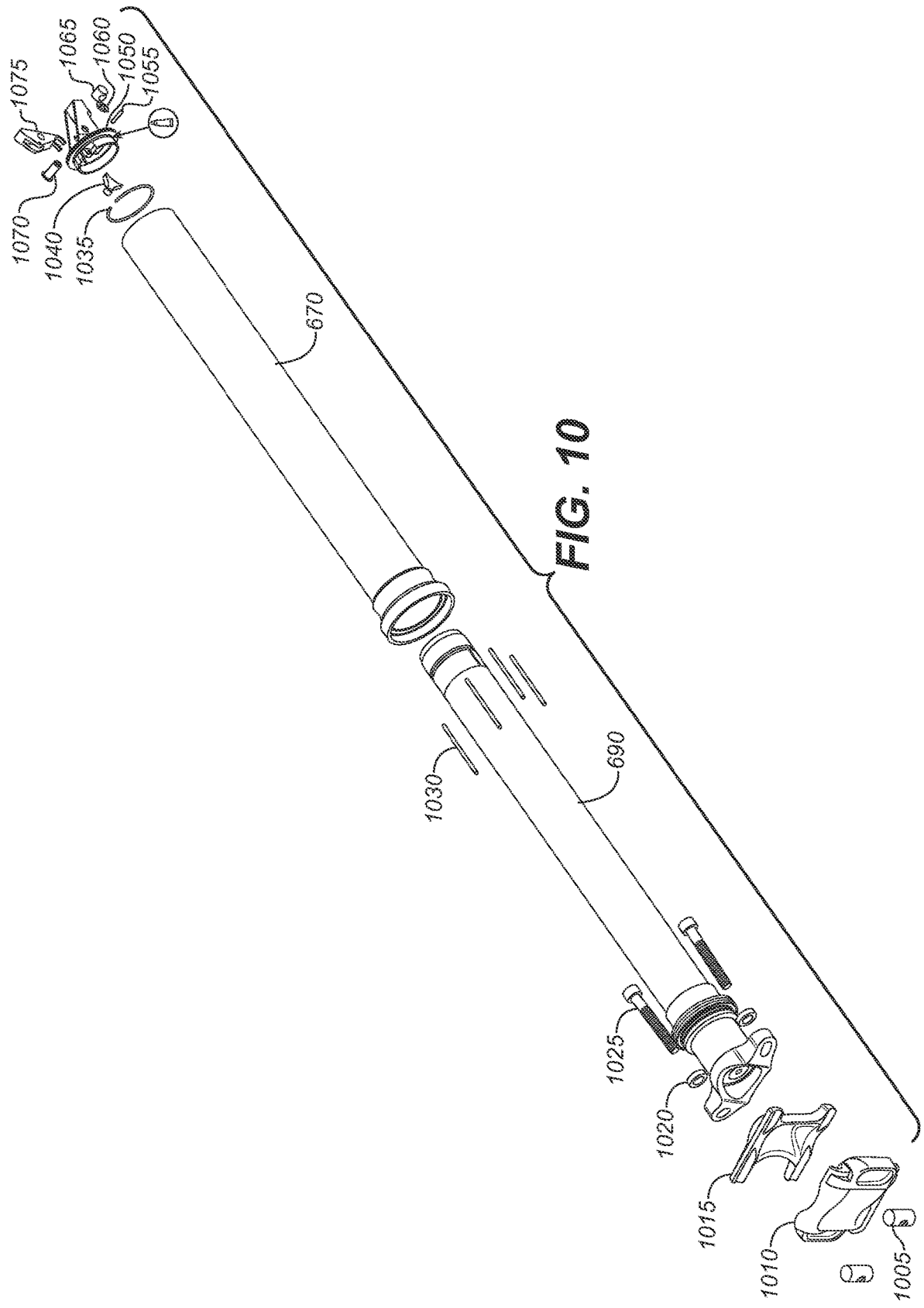

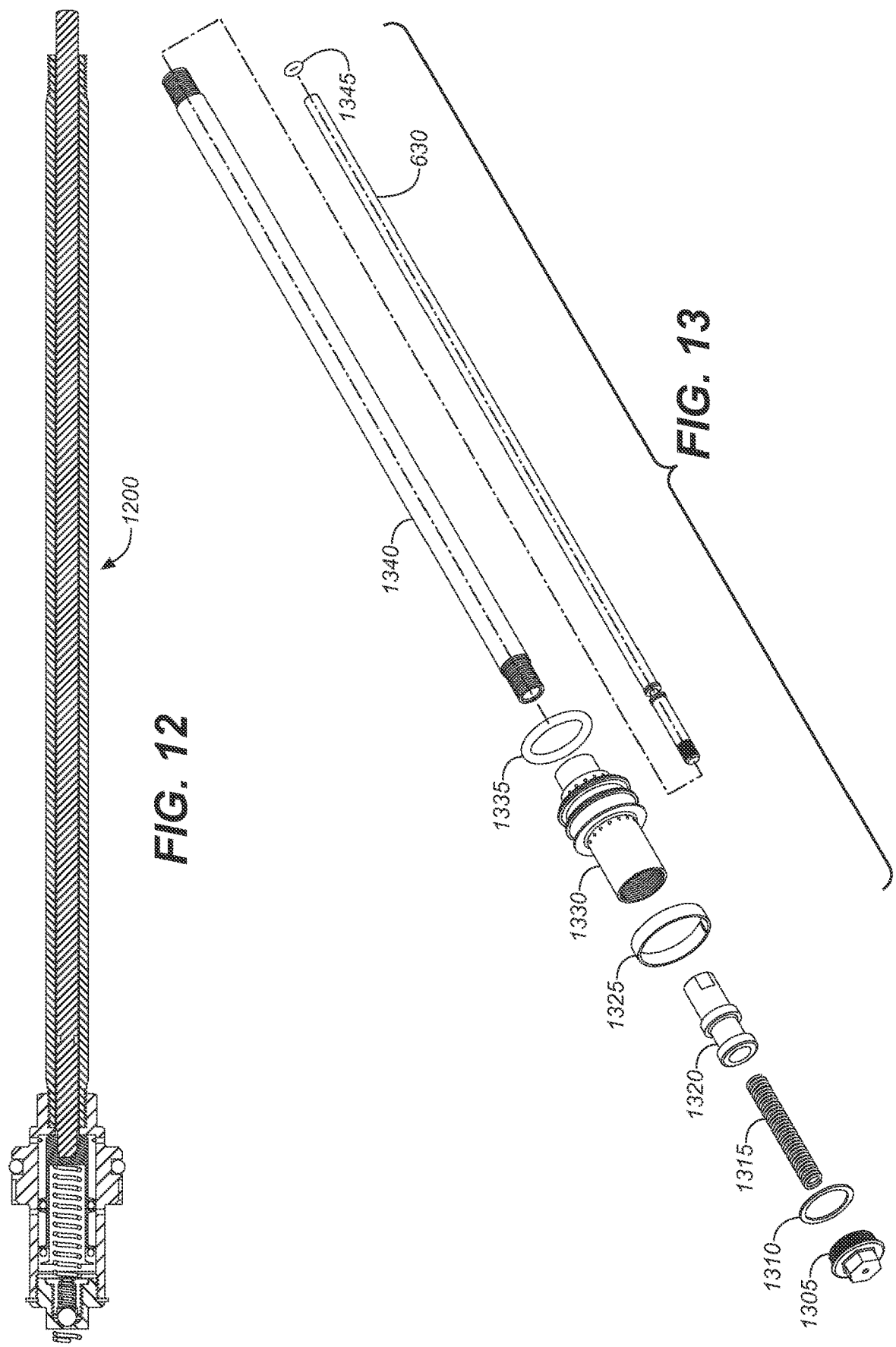

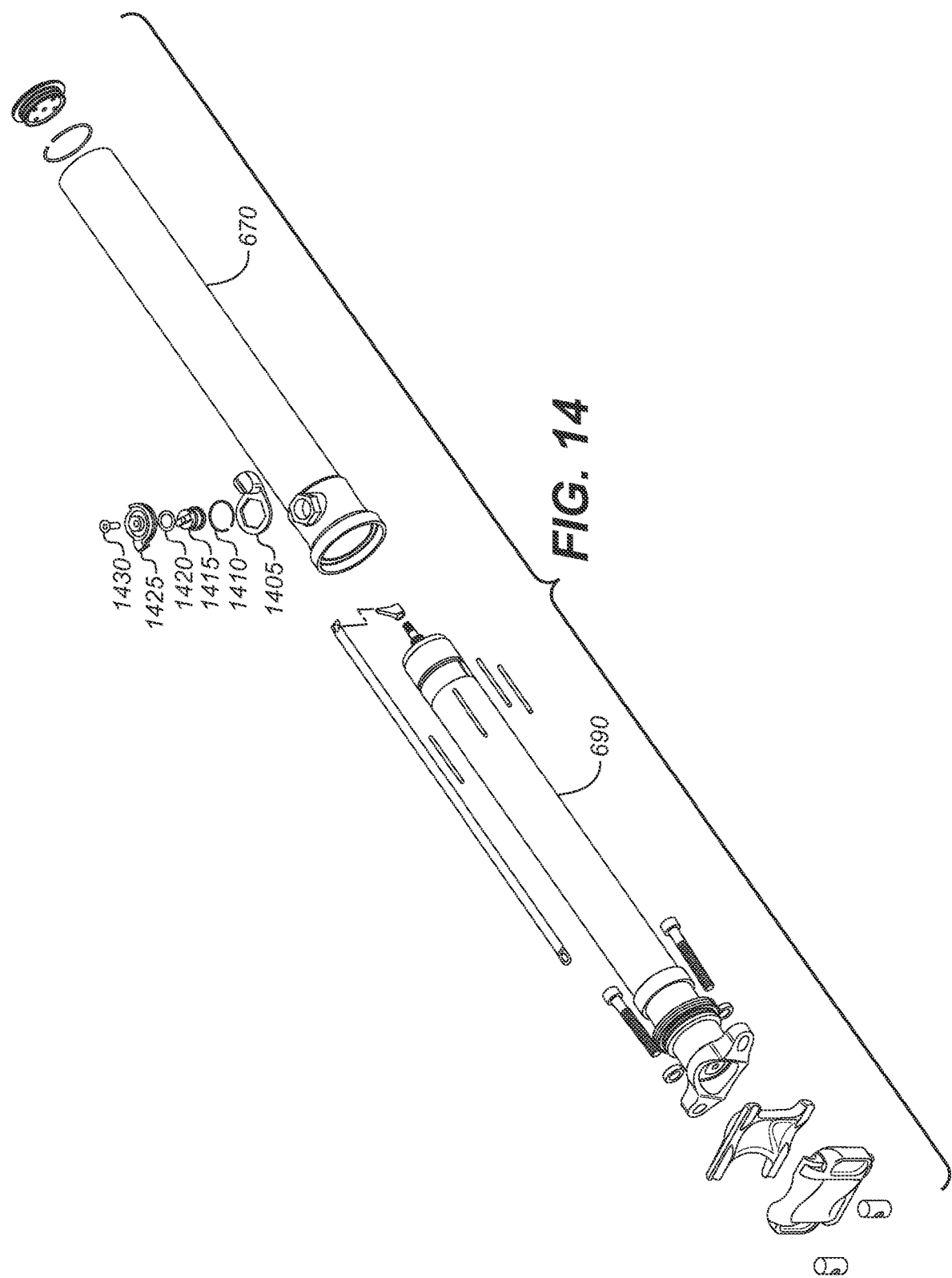

INFINITE ADJUST SEAT POST WITH PRESSURE RELIEF VALVE

CROSS-REFERENCE TO RELATED APPLICATIONS

This patent application is a continuation application of and claims the benefit of co-pending U.S. patent application Ser. No. 15/944,584, filed Apr. 3, 2018, entitled, "INFINITE ADJUST SEAT POST WITH PRESSURE RELIEF VALVE", by Barna Madau et al., assigned to the assignee of the present application, which is incorporated herein in its entirety by reference thereto.

The patent application Ser. No. 15/944,584 is a continuation application of and claims the benefit of U.S. patent application Ser. No. 14/887,126, filed Oct. 19, 2015, No U.S. Pat. No. 9,963,181, entitled, "INFINITE ADJUST SEAT POST WITH PRESSURE RELIEF VALVE", by Barna Madau et al., assigned to the assignee of the present application, which is incorporated herein in its entirety by reference thereto.

BACKGROUND

1. Field of the Invention

Embodiments generally relate to a seat support assembly for a vehicle. More specifically, embodiments of the invention relate to a height adjustable seat support.

2. Description of the Related Art

A conventional seat post for a bicycle includes a suspension system that comprises an upper post telescopically positioned within a lower post. Within the upper and lower posts are positioned at least an oil chamber and a gas chamber sealingly separated by an internal floating piston (IFP). The conventional suspension system further may include an adjustable piston rod connected to a main piston, wherein the main piston divides the oil chamber into portion "A", that portion of the oil chamber closest to the seat saddle, and portion "B", that portion of the oil chamber closest to the gas chamber. These conventional seat posts are adjustable upon the actuation of a lever mechanically and/or remotely connected with the piston rod. The movement of the piston rod ultimately results in the opening and closing of flow ports within the main piston.

During times of extreme conditions (e.g., high temperatures, sudden changes in terrain, etc.), the portion "A" of the oil chamber furthest away from the IFP may experience an increase in pressure that causes a condition commonly known as hydrostatic lock. The term, "hydrostatic lock", generally is understood to describe a condition in a suspension in which a volume of an incompressible fluid exceeds its maximum available volume in which it resides; such a condition may render surrounding components at least temporarily non-functional.

Therefore a need exists for a seat post that avoids hydrostatic lock conditions during extreme conditions.

BRIEF DESCRIPTION OF DRAWINGS

The accompanying drawings, which are incorporated in and form a part of this specification, illustrate embodiments of the present technology for a seat post, and, together with the description, serve to explain the principles discussed below:

FIG. 7 depicts the first portion and the second portion of the infinite adjust seat post of FIG. 6, including the pressure relief valve, in accordance with an embodiment.

FIG. 9 depicts an infinite adjust seat post with a pressure relief valve, having an actuation assembly disposed external to the seat post, in accordance with an embodiment.

FIG. 10. depicts the components associated with the upper post and the lower post of the infinite adjust seat post, analogous to the upper and lower posts of FIGS. 6-9, in accordance with an embodiment.

FIG. 12 depicts the cross section of the piston assembly of FIG. 11, assembled, in accordance with an embodiment.

FIG. 13 depicts an exploded view of the piston assembly of FIGS. 11 and 12, in accordance with an embodiment.

FIG. 14 depicts an exploded view of the upper post and the lower post, similar to that view shown in FIG. 10, but including an external adjustment mechanism, in accordance with an embodiment.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

The following discussion will first describe conventional seat post technology, and the limitations associated therewith, with reference to FIGS. 1A-5. The discussion then turns to a description of an infinite adjust seat post with a pressure relief valve, in accordance with an embodiment and with reference to FIGS. 6-16.

Figure 1A:
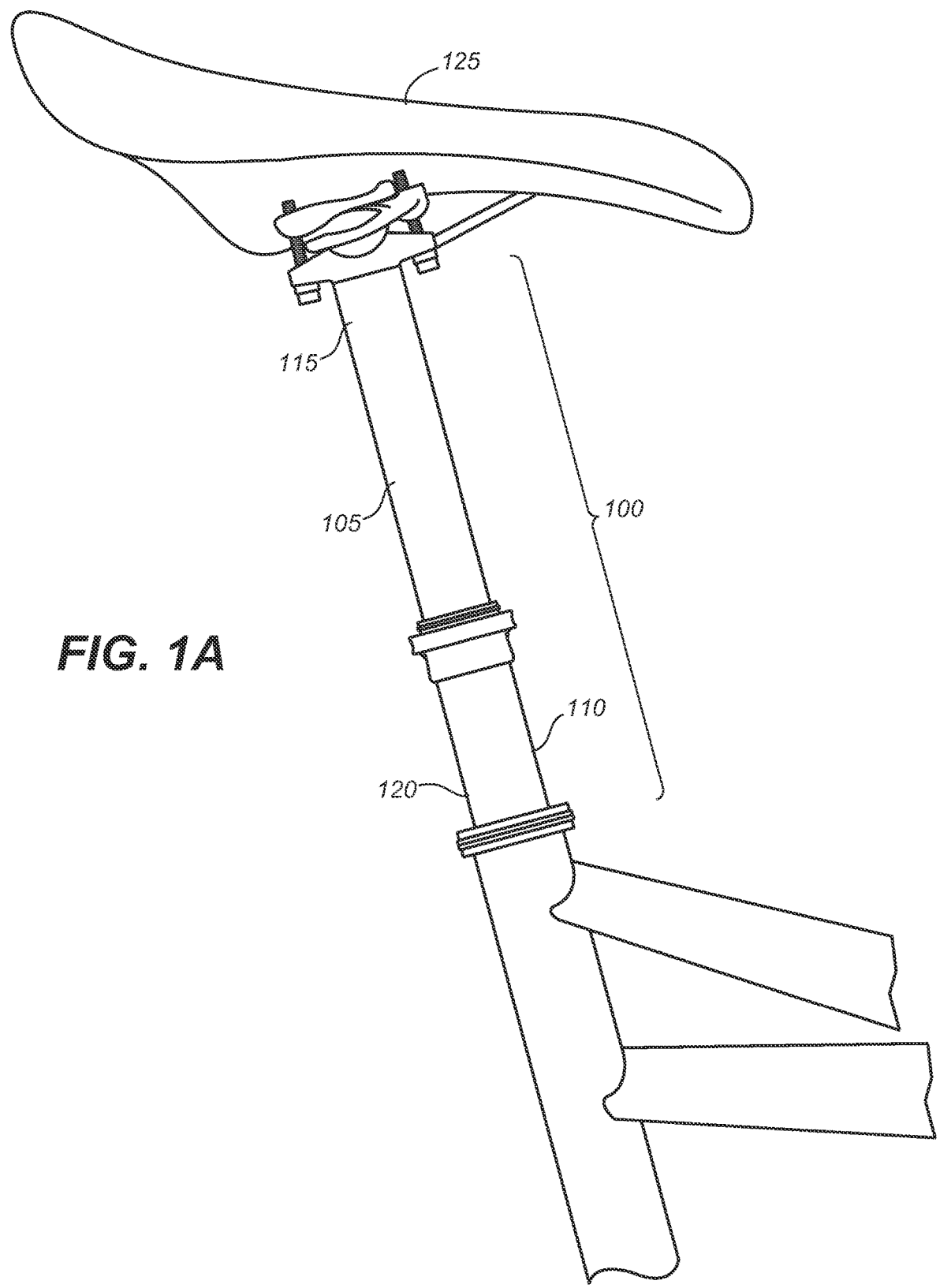
FIG. 1A depicts a conventional seat post, having a suspension system that supports a saddle thereon.
Figure 1B:
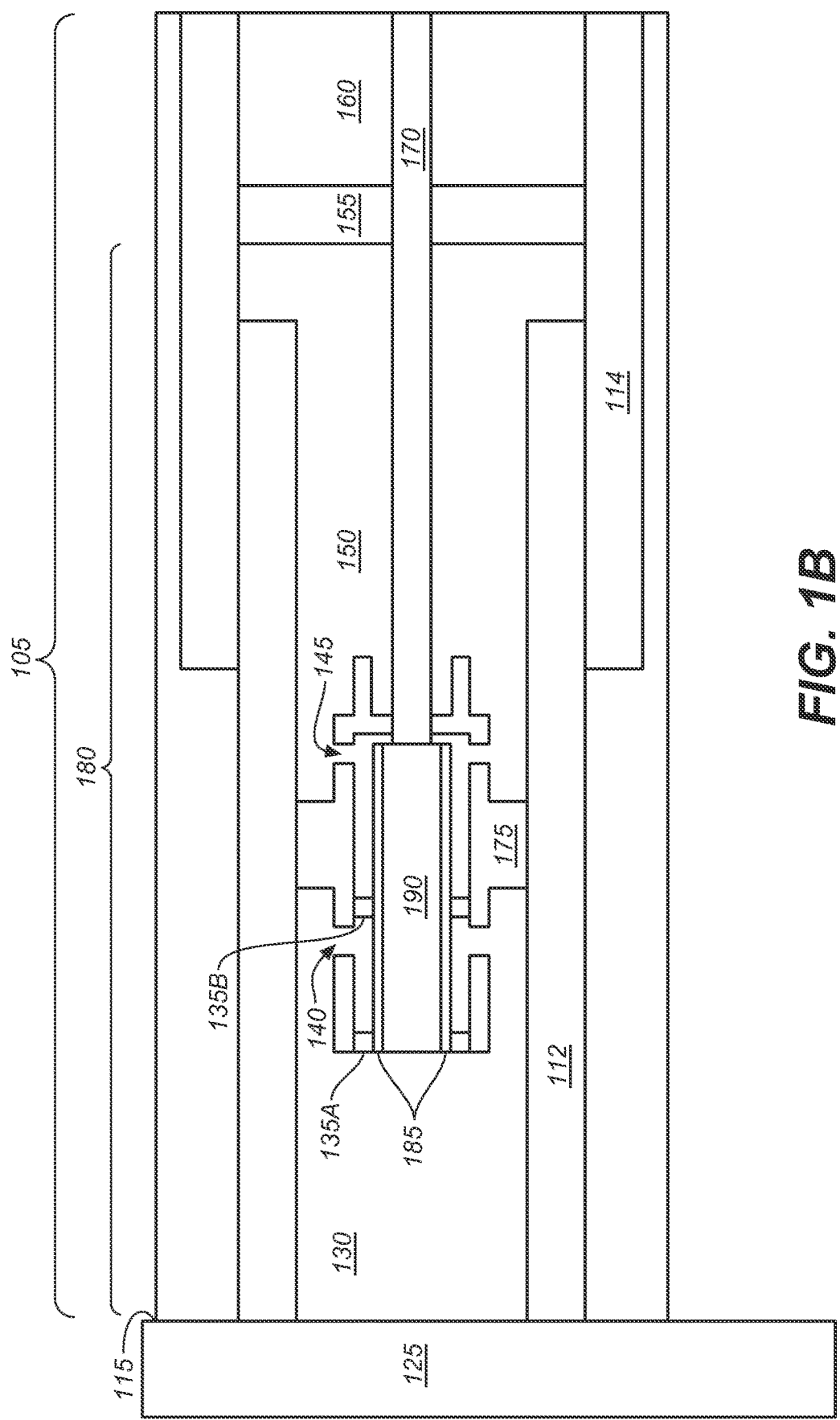
FIG. 1B depicts a block diagram of the conventional suspension system of FIG. 1A.

With reference to FIG. 1A, a conventional seat post is shown, having a conventional suspension assembly within a suspension system 100 that supports a saddle 125 thereon and comprises an upper post 105 (at a first end 115) telescopically positioned within a lower post 110 (at a second end 120). With reference to FIG. 1B, a block diagram of a portion 105, in the upper post 105, of the conventional suspension system 100 is shown. Within the upper post 105, is the upper post 112 telescopically positioned with a lower post 114. Within the upper post 112 and the lower post 114 is an internal floating piston (IFP) 155 that sealingly separates an oil chamber 180 and a gas chamber 160 positioned therein. A main piston 175, with flow ports A 140 and flow ports B 145 there through, separates the oil chamber 180 into portion "A" 130 and portion "B" 150. Portion "A" 130 is that portion of the oil chamber 180 that is closest to the saddle 125. Portion "B" 150 is that portion of the oil chamber 180 closest to the gas chamber 160. Further, a first end of an adjustable piston rod 170 connects with an actuation assembly 205 (FIG. 2) located at and external to the second end 120 of the suspension system 100. The second and opposite end of the piston rod 170 extends in length to connect with the main piston 175. One end of a spool valve 190 is positioned partially within the main piston 175 and is also positioned to receive the second end of the piston rod 170 upon movement of the piston rod 170. When the piston rod 170 is adjusted via the actuation assembly 165, it pushes against the spool valve 190, which in turn slides up and away from the direction of the IFP 155. The seals 135A and 135B on the outer walls of the spool valve 190 slide over flow port A 140 gaps in the walls of the main piston 175, thereby leaving open these flow ports A 140, and thereby allowing fluid to flow there through from the portion "A" 130 to the portion "B" 150.

Figure 2:
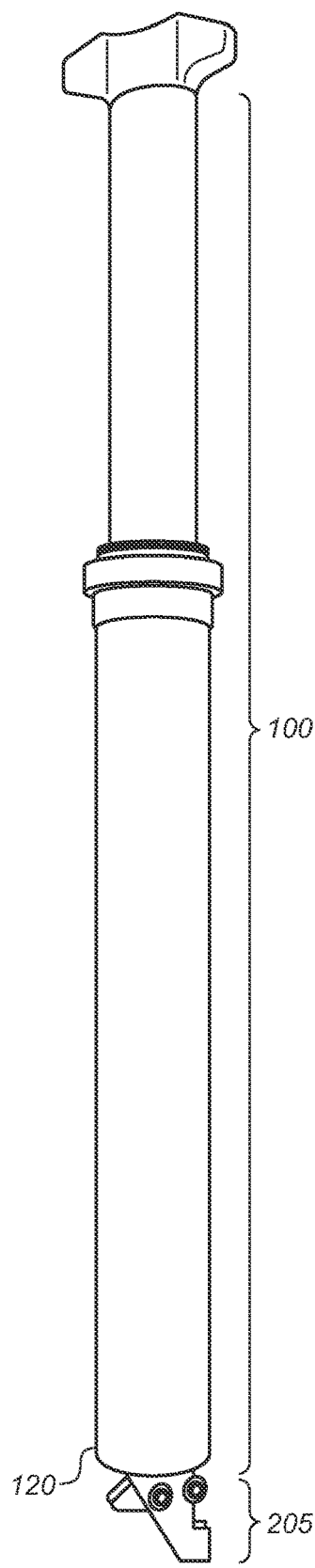
FIG. 2 depicts a conventional suspension system, including an upper and lower post.
Figure 3:
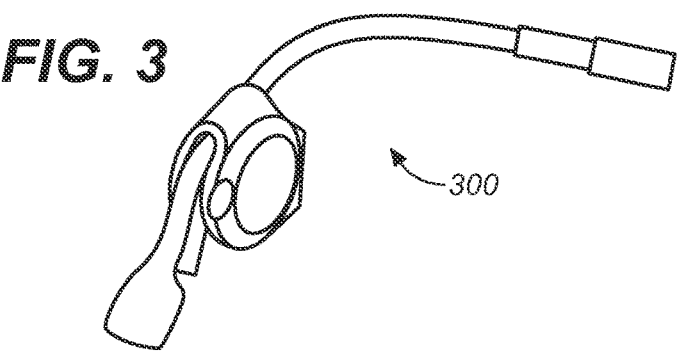
FIG. 3 depicts a conventional top mount lever for mechanical connection to the piston rod.
Figure 4:
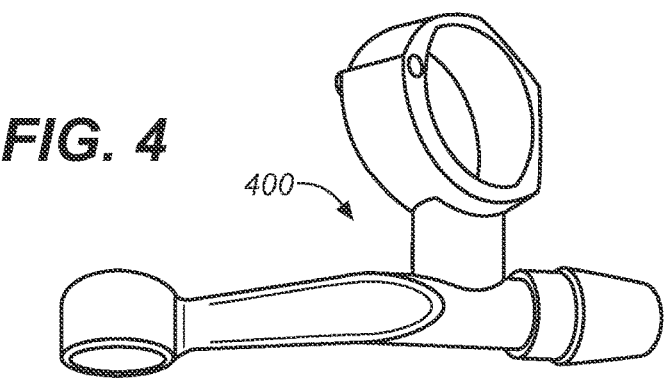
FIG. 4 depicts a conventional under mount lever for remote connection to the piston rod.
Figure 5:
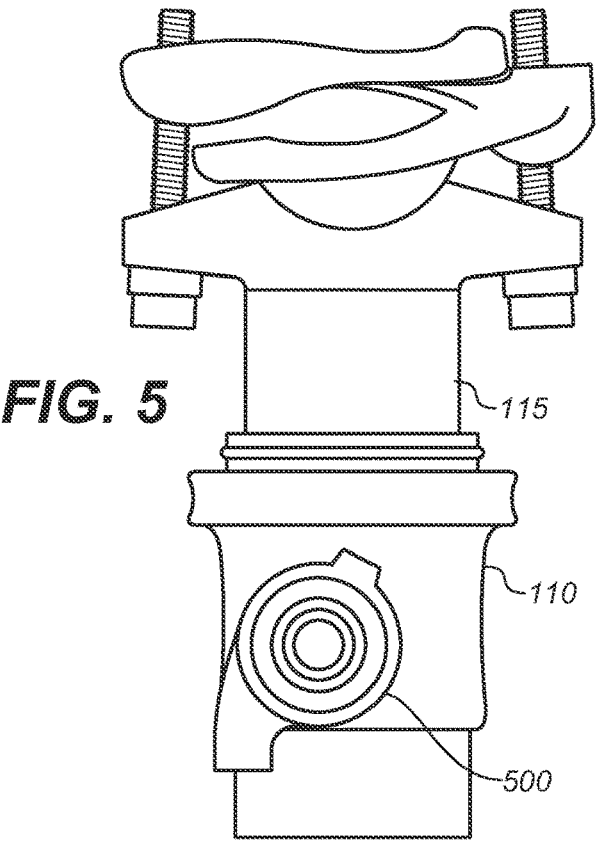
FIG. 5 depicts a conventional external adjustment mechanism disposed on a lower post.

These conventional suspension assemblies 100 are adjustable upon the actuation of an actuation assembly 205 at the second end 120 of the suspension system 100, shown at FIG. 2. The piston rod 170 is communicatively coupled with the actuation assembly 205 via a cable or through the use of remote technologies common in the field of technology. FIG. 3 shows a top mount lever 300 that may be attached to the bicycle handle bars and also be mechanically attached to the actuation assembly 205 via a cable. FIG. 4 shows an under mount lever 400 that may be attached to the bicycle handle bars and communicatively and remotely coupled with the piston rod 170 or the actuation assembly 205 through remote technologies commonly known in the art. FIG. 5 shows an example of an external adjustment mechanism 500 that is used to adjust the piston rod 170 and/or to adjust the spool valve 190. The movement of the piston rod 170, and hence the spool valve 190, ultimately results in the opening and closing of flow ports A 140 within the main piston 175.

As noted, when the flow ports A 140 in the main piston 175 are open, if the oil from portion "B" may flow through the main piston 175 and into portion "A" 130, then the upper post 105 of the suspension system 100 extends and raises the saddle 125 attached to the suspension system 100. If force is applied to the suspension system 100, such as by the rider sitting on the saddle 125, and the flow ports A 140 remain open, then oil flows from the portion "A" 130, through the main piston 175, and into the portion "B" 150. Such flow is slowed and/or stopped when: 1) the flow ports A 140 are subsequently closed (through an actuation of a mechanical or remote lever); or 2) when fluid pressure (via the oil) that is applied against a first side of the IFP 155 (that divides the oil chamber 180 and the gas chamber 160) is met by an equal or greater pressure applied against a second side of the IFP 155 by the gas within the gas chamber 160, wherein the second side of the IFP 155 is opposite the first side of the IFP 155.

Thus, as seen, the conventional mechanical and/or remotely connected lever is designed, upon actuation, to move the piston rod 170. The movement of the piston rod 170 moves the spool valve 190. The movement of the spool valve 190, the sliding up and down within the main piston 175, opens or closes flow ports A 140, respectively, within the main piston 175. The opened and closed flow ports A 140 causes the volume of oil within the oil chamber 180 to shift between the portion "A" 130 and the portion "B" 150. The shifting of the oil, from one chamber of oil to another chamber of oil, causes the suspension system 100 to expand or compress. The expansion or compression of the suspension system 100 causes the saddle 125 resting upon the suspension system 100 to move up or down, respectively.

In the situation in which the flow ports A 140 within the main piston 175 are closed, and the temperature internal to the suspension system 100 increases correspondingly to the temperature external to the suspension system 100, then the oil within the portion "A" 130 and portion "B" 150 also thermally expands. The thermally expanded oil within the portion "B" 150 increases in volume and pressing against and moves the IFP 155 in the direction of the gas chamber 160, thereby making the gas chamber 160 smaller while enlarging the portion "B" 150. However, the thermally expanded oil within the portion "A" 130 does not increase in volume since this oil presses against sliding 185 and sealing 135A and 135B elements that serve as valves (gates) through the flow paths A 140 of the main piston 175, keeping them from opening and creating more volume. As previously noted, in one instance, a lever mechanically or remotely, upon actuation, causes the piston rod 170 to move and thereby moves the adjacent spool valve 190. The spool valve 190 movement translates into sliding up and down within the main piston 175. The walls of the spool valve 190 are made of "sliders" 185 and have seals extending there from and are attached thereto. When in the "open" position, the seals 135B are positioned on one side of the flow ports A 140, toward the saddle 125 direction. While in the open position, the flow pathway A 140 remains unblocked. While in the "closed" position, the seals 135B are positioned on the other side of the flow ports A 140, toward the gas chamber 160 direction. While in the closed position, the flow pathway after entering and exiting the flow port A 140 remains blocked by the seals 135B, such that oil may not pass there through (within the main piston 175) from the portion "A" 130 to the portion "B" 150.

At some point, the increase in the pressure within the portion "A" 130 of the oil chamber 180 becomes so great that the lever (e.g., the top mount lever 300 of FIG. 3) that is connected to the piston rod 170 cannot be pushed down (without extreme force) to cause the piston rod 170 to move. Since the piston rod 170 cannot be moved, the spool valve 190 cannot be moved, and the seals 135B extending from the slider 185 of the spool valve 190 remain in place and continue to block the flow pathway A 140. Since oil is unable to flow from the portion "A" 130 to the portion "B" 150 and vice versa, the suspension system 100 succumbs to what is commonly known as hydrostatic lock, wherein the suspension system 100 cannot compress or expand upon actuation of a lever.

As the foregoing illustrates, what is needed in the art are improved techniques for adjusting seat post heights while avoiding and/or overcoming a potential hydrostatic lock situation.

Example Infinite Adjust Seat Post with Pressure Relief Valve

Embodiments of the present technology provide for an infinite adjust seat post with a pressure relief valve that prevents and eliminates hydrostatic lock by using the increase in pressure, which would normally occur in situations producing hydrostatic lock, to open a pressure relief valve. The pressure relief valve is strategically positioned in series with a spool valve, taking advantage of the fluid channel disposed within the spool valve to transfer oil from one side of the main piston to the other side of the main piston. These concepts will be discussed herein.

Additionally and as will be explained below, the infinite adjust seat post provides for two parallel pathways, each having a different entry point in the main piston, but the same destination. Together, the two pathways function to allow fluid to move from a portion "A" to a portion "B" of the oil chamber. Separately, each flow pathway receives fluid flow non-concurrently.

Figure 6:
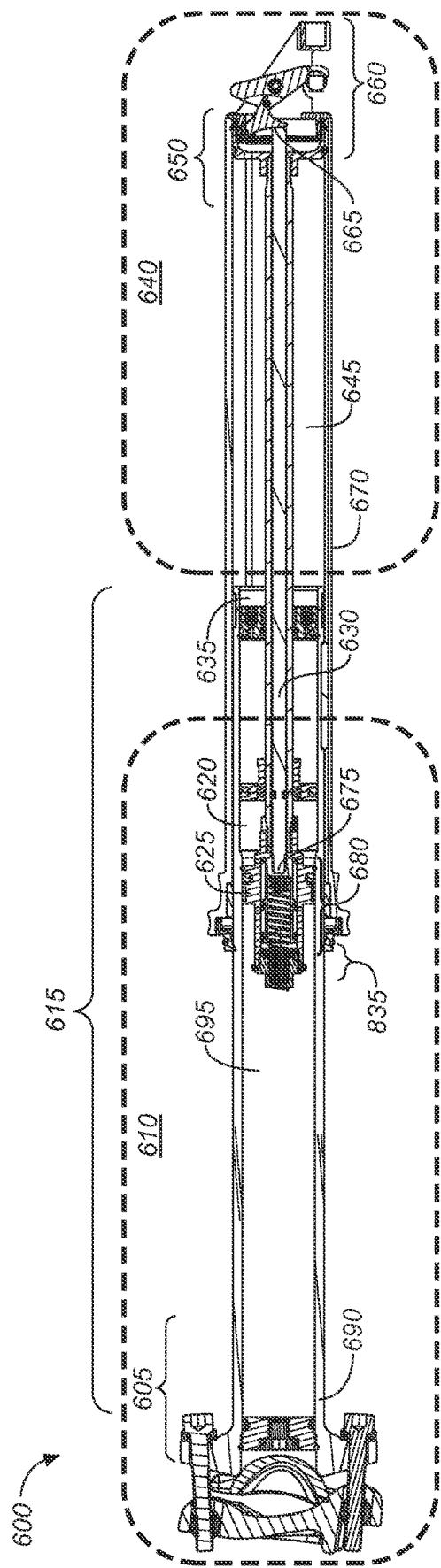
FIG. 6 depicts an infinite adjust seat post with a pressure relief valve, in accordance with an embodiment.

FIG. 6 depicts an infinite adjust seat post 600 with a pressure relief valve 835, in accordance with an embodiment. More particularly, FIG. 6 shows an upper post 690 telescopically positioned within a lower post 670. The actuation assembly 660 is shown connected to the second end 650 of the infinite adjust seat post 600, at the lower post 670. The actuation assembly 660 includes a set of components (e.g., wire, metal tabs) that function together to, upon actuation, move the piston rod 630 either in a first direction or in an opposite second direction. Interior to the inner walls of the upper and the lower posts, 690 and 670, respectively, are an oil chamber 615 and a gas chamber 645. The IFP 635 separates the oil chamber 615 from the gas chamber 645, and provides a seal there between. Further, the main piston 625 separates the oil chamber into portion "A" 695 and portion "B" 620. Portion "A" 695 is positioned closest to the saddle and portion "B" 620 is positioned opposite portion "A", at the other end of the oil chamber 615.

Figure 8:
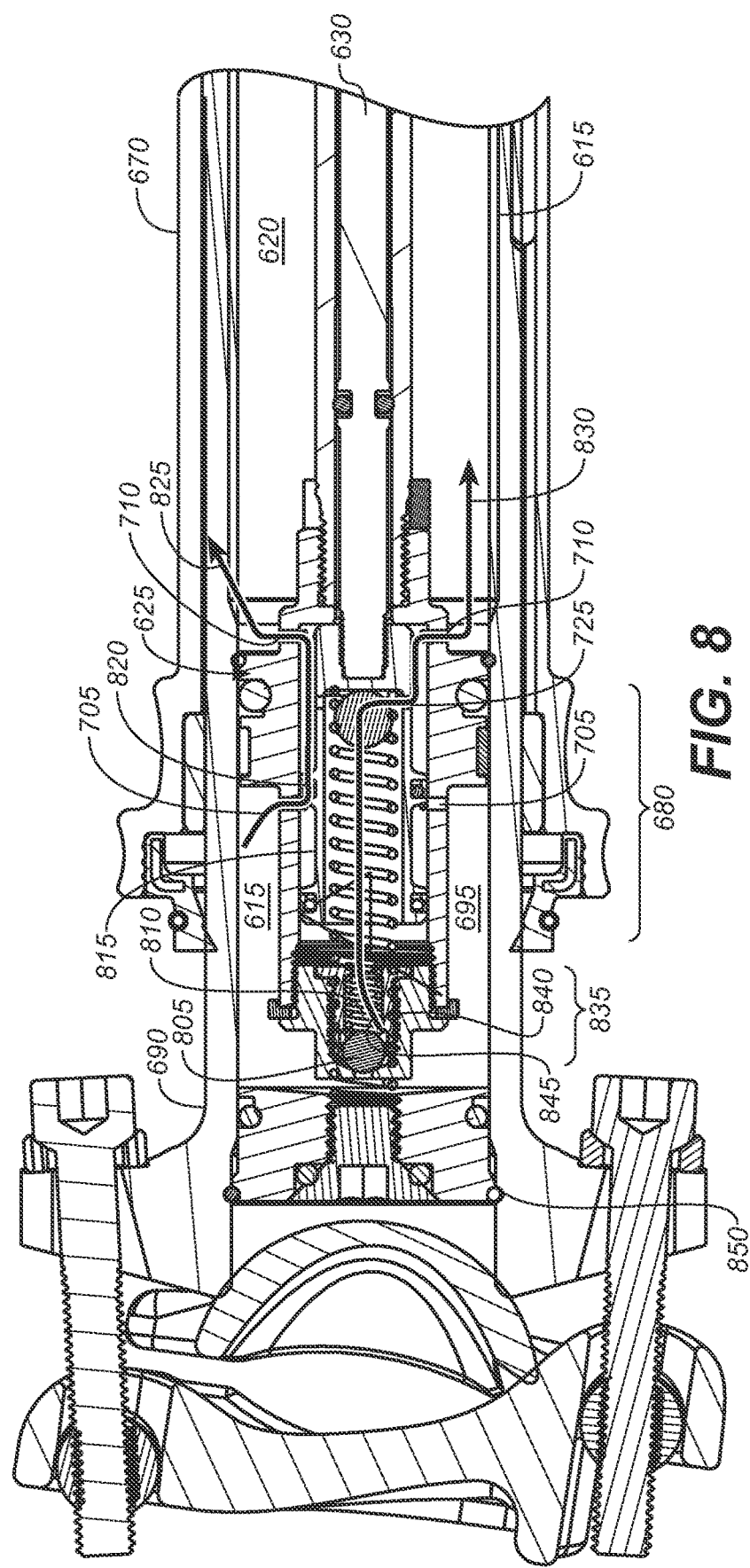
FIG. 8 depicts an enlarged view of the first portion of the infinite adjust seat post of FIG. 7, in accordance with an embodiment.

The main piston 625 has flow ports A 705 and flow ports B 710 (FIGS. 7 and 8) disposed therein that enable oil to flow from the portion "A" 695 to the portion "B" 620 and vice versa. The first end 665 of the piston rod 630 connects with the actuation assembly 660, while the second end 675 of the piston rod 630 connects with and resides within the main piston 625. More particularly, the main piston 625 provides a guided slot 725 (FIG. 7) central thereto and there through that allows for the movement of the piston rod 630 back and forth therein. The second end 675 of the piston rod 630, upon its movement in a direction toward the main piston 625, butts up against and pushes on a first end of the spool valve 680. The walls of the spool valve 680, called sliders 815 (functioning to slide back and forth within the main piston 625) (FIG. 8), have extensions thereon, called seals 820 (FIG. 8). These seals 820 fit snugly against the inner walls of the main piston 625, such that fluid may not flow through or around the seals 820. Upon being pushed at its first end, the spool valve 680 slides in a direction that is toward the portion "A" 695 of the oil chamber 615, opening up flow ports B 710 (FIGS. 7 and 8) disposed within the main piston 625, thereby allowing oil to flow there through. A pressure relief valve 835 is shown, disposed in series with the spool valve 680, disposed partially within the interior of the main piston 625, and disposed partially within the portion "A" 695 side of the main piston 625.

FIG. 7 depicts the first portion 610 and the second portion 640 of the infinite adjust seat post 600 of FIG. 6, including the pressure relief valve 835. However, in order to exhibit a higher degree of detail, the middle portion of the infinite adjust seat post 600 of FIG. 6 has been redacted. Shown in FIG. 7 is the upper post 690 telescopically disposed within the lower post 670. The actuation assembly 715 is positioned at the second end 650 of the infinite adjust seat post 600, at the lower post 670. The IFP 635 separates the gas chamber 645 from the oil chamber 615. The oil chamber 615 is divided into the portion "A" 695 and the portion "B" 620 by the main piston 625 there between. The main piston 625 has flow ports A 705 and flow ports B 710 disposed therein. The pressure relief valve 835 and the spool valve 680 are shown positioned in series with each other and also partially positioned within the main piston 625. The first end 665 of the piston rod 630 is shown connected to the actuation assembly 715 and the second end 675 of the piston rod 630 is shown disposed within the guided slot 725 of the main piston 625. Additionally, anti-rotation pins 720 are shown. As positioned, these anti-rotation pins 720 prevent the upper post 690 from rotating circularly within the lower post 670.

FIG. 8 depicts an enlarged view of the first portion 610 of the infinite adjust seat post 600 of FIG. 7, in accordance with an embodiment. The flow ports A 705 and flow ports B 710 within the main piston 625 and the flow pathways A 825 within the upper post 690 are more clearly visible and will be described below. Again, the piston rod 630 is shown connected within the guided slot 725 of the main piston 625. Disposed within the walls of the main piston 625 are flow ports A 705 and flow ports B 710. Flow pathway A 825 is also shown, traveling from the portion "A" 695 of the oil chamber 615, into and out of the flow ports A 705, into the interior of the main piston 625, into and out of the flow ports B 710, and then into the portion "B" 620 of the oil chamber 615. Further, in other embodiments, the flow pathway A 825 is reversed. Also shown, in FIG. 8 is the pressure relief valve 835 and the spool valve 680. The outer walls of the spool valve 680 include the sliders 815 and the seals 820 extending from the sliders 815. The pressure relief valve 835 includes the ball 805 and the spring 810. Flow pathway B 830 is shown, traveling from the portion "A" 695 of the oil chamber 615, into and through the gap 845 left by the ball 805 being pushed against the spring by the pressurized oil, into the interior of the main piston 625, into and out of the flow ports B 710, and into the portion "B" 620 of the oil chamber 615.

With reference to FIG. 8, the effects of thermally expanded oil within the oil chamber 615 and the application of the pressure relief valve 835 to prevent hydrostatic lock of the infinite adjust seat post 600 is now explained. In this case, the pressure relief valve 835 of the infinite adjust seat post 600 provides for the release (and relief) of the build-up of pressure within the portion "A" 695 of the oil chamber 615, due to, in some embodiments, the thermal expansion of the oil. In one example, initially, the slider 815 and the seal 820 of the spool valve 680 are positioned on the saddle side of the flow ports A 705. (Not shown; of note, FIG. 8 shows the seal 820 positioned to one side of the flow ports A 705, toward the direction of the gas chamber.) In this position, oil from the portion "A" 695 of the oil chamber 605 is allowed to travel along the flow pathways A 705, from the portion "A" 695, into and out of the flow ports A 705, through the interior of the main piston 625, into and out of the flow ports B 710, and into the portion "B" 620, and vice versa.

Situations in which the flow ports A 705 would be "open" include at least the following scenarios: 1) when no force is being applied against the saddle; and 2) when the second end 675 of the piston rod 630 is pushing against the spool valve 680, and in which the spool valve 680 is pushed in the direction toward the saddle, thereby leaving flow ports A 705 open.

Situations in which the flow ports A 705 would be "closed", and could cause hydrostatic lock include at least the following scenarios: 1) the piston rod 630 is not actuated to push against the spool valve 680 and much force is being continuously applied to the saddle; 2) the piston rod 630 is not actuated to push against the spool valve 680 (in the direction toward the saddle), and the bicycle goes over a large unexpected bump, driving the rider further onto the saddle during impact with the ground, causing the upper piston 850 to push against the upper part of the spool valve 680 during compression. The spool valve 680 then slides downward in the direction toward the gas chamber, and its seals block the flow pathways A 825; and 3) during thermal expansion of the oil, the volume within the portion "A" 695 of the oil chamber 615 cannot expand into the portion "B" 620, since the initial thermal expansion of the oil in portion "A" 695 causes the spool valve 680 to be pushed downwards toward the gas chamber, thereby blocking the flow pathways A 825.

FIG. 8 depicts the pressure relief valve 835, which functions to release the pressure being applied against the seals 820 (when the seals 820 are in the position shown in FIG. 8 [on one side of the flow ports A 705, in the direction of the gas chamber, blocking the flow pathways A 825), and eliminate the possibility of hydrostatic lock from occurring. The pressure relief valve 835 includes an annular wall 840, surrounding a ball 805 that sits on top of a spring 810. The spring 810 comprises a predetermined spring pressure. When a particular amount of pressure is applied against the ball 805, the ball 805 pushes downward against the spring 810, overcoming the spring force. Thus, when the oil is pressurized to a higher degree than the spring 810 holding the ball 805, then the ball 805 pushes the spring 810 downwards and exposes the gap 845 through which pressurized oil may flow. This pressurized oil flows along the flow pathway B 830. Just enough pressurized oil flows through the gap 845 and past the ball 805 to lower the amount of pressure being experienced by the oil remaining in the portion "A" 695 of the oil chamber 615. When oil is pressurized and applies force to the ball 805 that is a degree lower than the force applied an the opposite side of the ball 805 from the spring (having a particular spring constant), then the force being applied against the ball 805 is not enough to overcome the spring constant and push the spring 810 downwards.

However, by opening up the gap 845 to allow for some pressurized oil to flow through, the amount of oil left in the portion "A" 695 is less than was there before, while the area remains the same, thus increasing the volume for the oil that is left. Thus, by the formula, $PV=nRT$, it can be seen that as the volume increases, the pressure decreases (given a constant temperature). Thus, the pressure that is holding the seals 820 in the position that blocks the flow pathway A 825 is reduced. It is reduced enough to enable the piston rod 630 to move the spool valve 680 against the remaining pressure being applied to the seal 820. Thus, after the pressure relief valve 835 opens up, thereby reducing the pressure within the oil remaining in the portion "A" 695 and also reducing the force being applied against the seal 820, that was holding the spool valve 680 in place, the bicycle rider is now is able to physically pull or push the lever and actuate the piston rod 630 (causing the piston rod 630 to move).

As can be seen, the present technology uses the increased pressure caused by a hydrostatic lock scenario to its benefit, harnessing this pressure to actuate the pressure relief valve 835. Upon actuation, the pressure relief valve 835 opens to let pressurized oil flow from the over-pressurized volume of the portion "A" 695 and into the expandable volume of the portion "B" 620. Such an innovative process provides for a hydrostatic lock-free existence, regardless of the riding scenario.

In conventional designs, and without the pressure relieve valve 835, the spool valve 680 would end up stuck in a hydrostatic lock position, blocking the flow of any oil from the portion "A" 695 to the portion "B" 620 of the oil chamber 615 through the flow paths A 825. As noted herein, the pressure relief valve 835 is situated in series with the spool valve 680, such that the flow pathway B 830 travels through both components before exiting the main piston 625 and entering the portion "B" 620 of the oil chamber 615. Additionally, and significantly the two flow pathways, A 705 and B 710, have different points of entry into the main piston 625, but the same destination point. This is significant since the seal 820 blocking the origination point of the flow pathway B 830 is concurrently entering a hydrostatically locked position, while the pressure potentially causing the hydrostatically locked position is that which triggers the flow pathway B 830 to open, thereby alleviating or eliminating any pre-hydrostatic lock symptoms. As such, the infinite adjust seat post 600 with the pressure relief valve 835, in accordance with embodiments, does not experience hydrostatic lock.

FIGS. 9-16 that follow are further figures that help detail various particularities regarding the infinite adjust seat post with a pressure relief valve, in accordance with various embodiments.

FIG. 9 depicts an infinite adjust seat post 600 with a pressure relief valve 835, having an actuation assembly 660 being external to the infinite adjust seat post 600, in accordance with an embodiment. In FIG. 9, it is seen that the actuation assembly 660 is mounted at the second end 650 of the lower post 670. FIG. 5 also offers another view of the externally mounted actuation assembly (such as seen in FIG. 5). The actuation assembly 660 of FIGS. 6 and 9 functions to cause the spool valve 680 to slide back and forth (or up and down) within the main piston 625, thereby opening and closing, respectively, the flow pathway A 825.

FIG. 10. depicts the components associated with the upper post 690 and the lower post 670 of the infinite adjust seat post 600, analogous to the upper and lower posts, 690 and 670, respectively, of FIGS. 6-9, in accordance with an embodiment. According to one embodiment, these components include, and are listed from the top of the depicted infinite adjust seat post to its bottom, the following: a seat post saddle clamp shaft cross pin; a forged upper saddle clamp, a forged lower saddle clamp; a washer fastener for a spherical saddle clamp; a seat post bolt with a conical under head features fastener; an upper post; a pin; a lower post; an internal wire retaining ring; a seat post rocker link; a Loctite; a seat post cable stop bottom cap; a SST dowel; an SS external shaft E-clip; a seat post cable bushing; a headed pin; and a seat post actuation lever.

Figure 11:
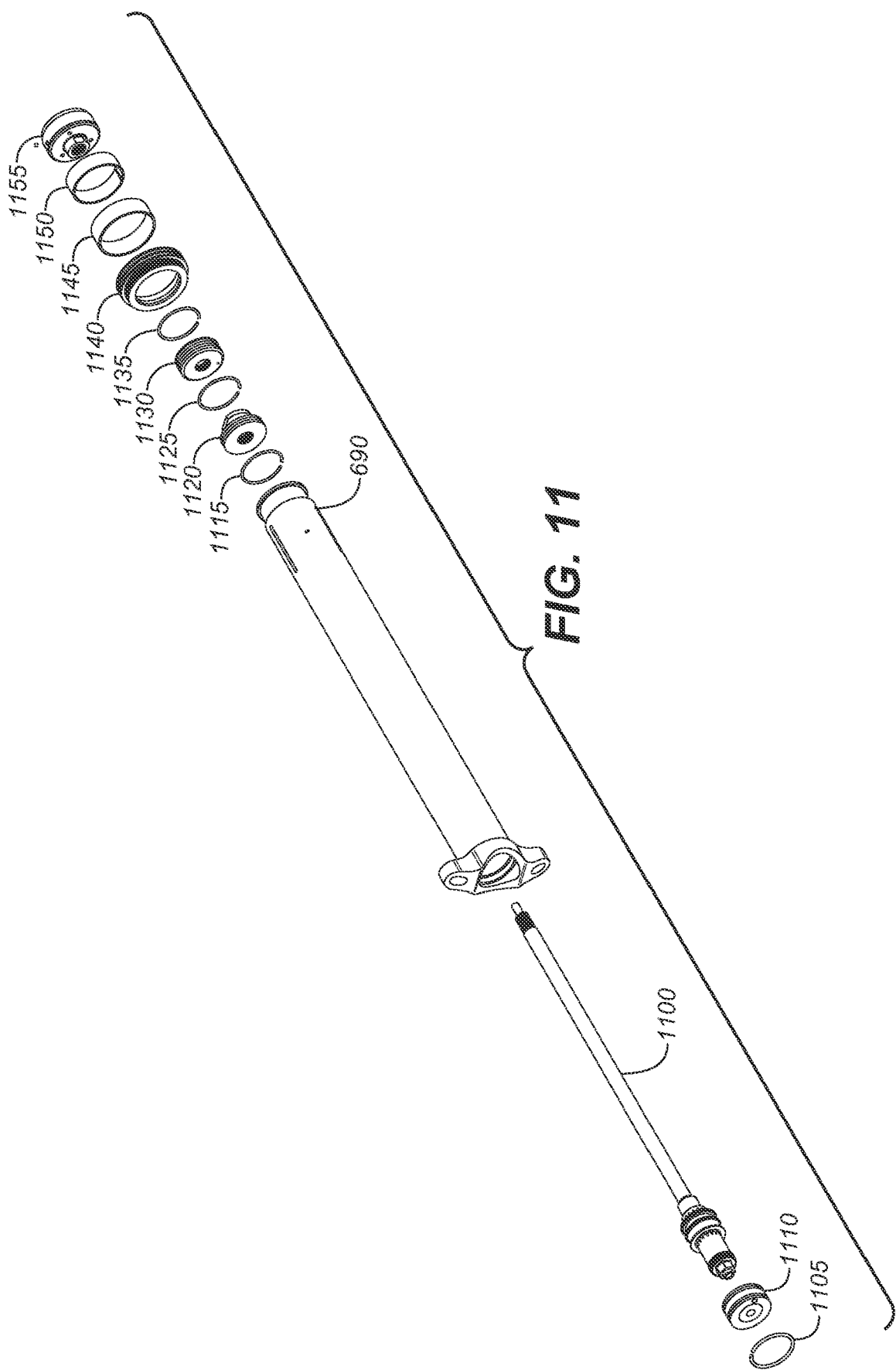
FIG. 11 depicts an exploded view of the upper post and portions of the piston assembly that is inserted into the upper post, in accordance with an embodiment.

FIG. 11 depicts an exploded view of the upper post 690 and portions of a piston assembly that is inserted into the upper post 690, in accordance with an embodiment. The components of FIG. 11 are listed, as assembled, from the internal wire retaining ring on the left to the shaft lug on the right, as follows: an internal wire retaining ring; a seat post spool valve cap assembly; a piston assembly; an upper post; an internal wire retaining ring; a seat post IFP assembly; a wire retaining bore retaining ring; a seat post seal head; a ring; a seat post seal; a seat post upper bushing; a seat post lower bushing; and a shaft lug.

FIG. 12 depicts the cross section of the piston assembly of FIG. 11, assembled, in accordance with an embodiment. FIG. 13 depicts an exploded view of the piston assembly of FIGS. 11 and 12, in accordance with an embodiment. The components of FIG. 13 are listed, as assembled, from the seat post pressure relief valve on the left to the O-ring seals on the right, as follows: seat post pressure relief valve; seat post crush washer; spring music wire; seat post spool valve; seat post piston glide ring; seat post spool valve piston; O-ring; push rod; shaft; and O-ring seals.

FIG. 14 depicts an exploded view of the upper post 690 and the lower post 670, similar to that view shown in FIG. 10, though including an external adjustment mechanism, in accordance with an embodiment. The infinite adjust seat post of FIG. 14 further includes, beyond those components shown in FIG. 14, the following components, as assembled, from the seat post cable actuation stop; the external retaining ring; the seat post bell crank shaft; the O-ring seals; the seat post pulley; and the flat-head socket cap screw.

Figure 15:
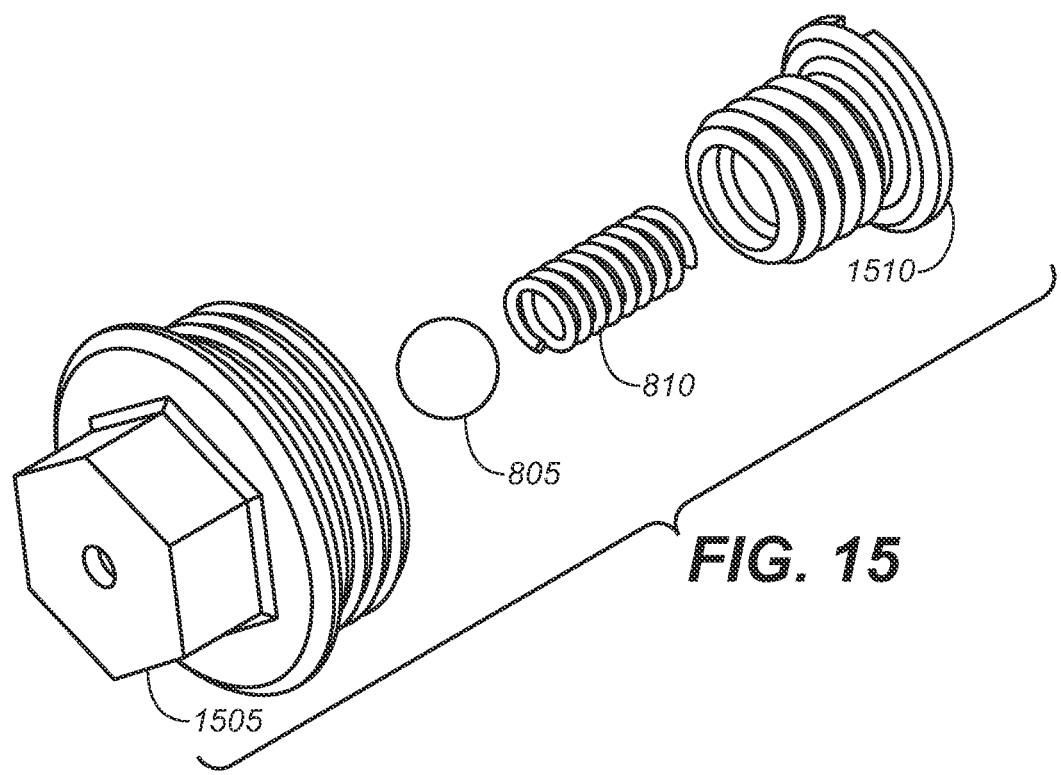
FIG. 15 depicts an exploded view of the pressure relief valve of FIG. 13, in accordance with an embodiment.

FIG. 15 depicts an exploded view of the pressure relief valve 835 of FIG. 13, in accordance with an embodiment. The components of FIG. 13 are listed in the order to be assembled, from the seat post spool valve cap to the pressure relief valve spring retainer, as follows: the spool valve cap; the steel ball; the detent spring; and the pressure relief valve spring retainer.

Figure 16:
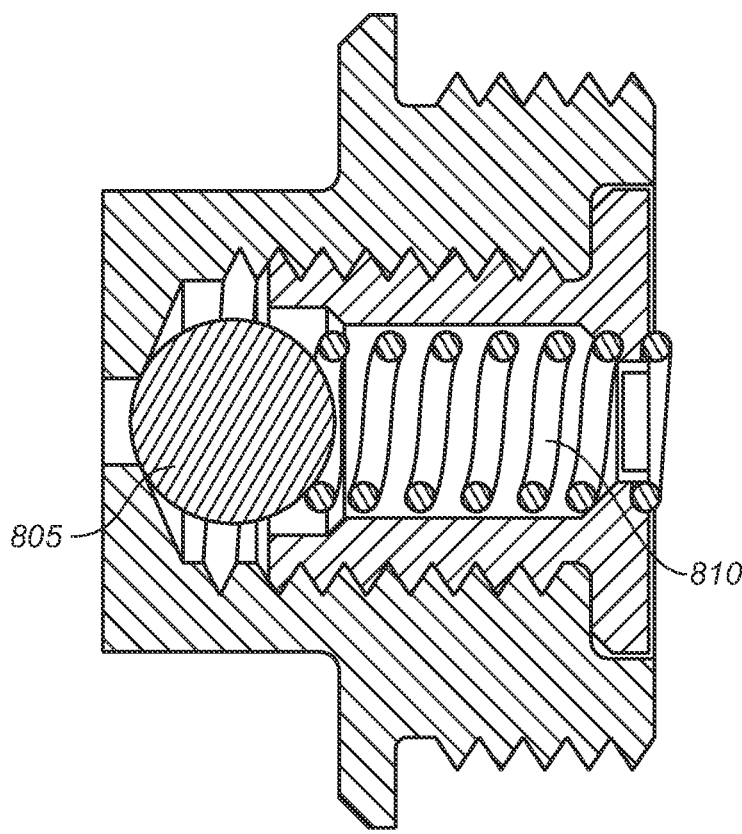
FIG. 16 depicts a cross sectional view of the pressure relief valve of FIG. 15, in accordance with an embodiment.

FIG. 16 depicts a cross sectional view of the pressure relief valve 835 of FIG. 15, in accordance with an embodiment. Components shown in FIG. 16 include the ball 805 and the spring 810.

While the foregoing is directed to embodiments of the present invention, other and further embodiments of the invention may be implemented without departing from the scope of the invention, and the scope thereof is determined by the claims that follow.

What we claim is:

1. An adjustable seat post comprising:
    an upper post;
    a lower post, wherein said upper post and said lower post are telescopically disposed with respect to each other;
    a piston coupled to said lower post;
    a first valve at least partially disposed within said piston, said first valve controlling a first fluid pathway through said piston, wherein said first fluid pathway extends between a first portion of a fluid chamber and a second portion of said fluid chamber, said first portion of said fluid chamber and said second portion of said fluid chamber separated by said piston;
    an internal floating piston disposed within said seat post, said internal floating piston disposed between said second portion of said fluid chamber and a gas chamber such that said internal floating piston separates said gas chamber from said second portion of said fluid chamber;
    a second valve at least partially disposed within said piston, said second valve providing a second fluid pathway through said piston, wherein said second fluid pathway extends between said first portion of said fluid chamber and said second portion of said fluid chamber and provides a bypass for fluid to flow between said first portion of said fluid chamber and second portion of said fluid chamber when at least a portion of said first fluid pathway is closed; and
    an actuation assembly disposed external to said seat post, said actuation assembly coupled to said lower post.

2. The adjustable seat post of claim 1, wherein said first valve comprises:
    a wall comprising at least one slider, said at least one slider configured for sliding within said piston; and
    at least one seal extending from said wall, said at least one seal is disposed against an inner surface of said piston to prevent fluid from flowing between said at least one seal and said inner surface of said piston.

3. The adjustable seat post of claim 1, wherein said first valve comprises:
    a spool valve.

4. The adjustable seat post of claim 1, wherein said second valve comprises:
    a pressure relief valve.

5. The adjustable seat post of claim 1, wherein said second valve comprises:
    a spring;
    a ball coupled to said spring; and
    an annular wall surrounding at least a portion of said ball, said second valve having a first position in which said ball has not sufficiently compressed said spring, and said second fluid pathway is closed, said second valve having a second position in which said ball has sufficiently compressed said spring, and said second fluid pathway is open.

6. The adjustable seat post of claim 1, further comprising:
    a piston rod having a first end and a second end, said first end of said piston rod coupled to said piston; and
    said actuation assembly coupled to said second end of said piston rod, said actuation assembly having first position in which said first end of said piston rod is pushed against said first valve causing said first valve to slide within said piston.

7. The adjustable seat post of claim 1, further comprising:
    an anti-rotation pin disposed between said upper post and said lower post, said anti-rotation pin maintaining an alignment between said upper post and said lower post such that said upper post and said lower post do not rotate with respect to each other.

8. The infinite adjust seat post of claim 1, wherein said actuation assembly is actuated by a mechanical lever.

9. The infinite adjust seat post of claim 1, wherein said actuation assembly is actuated remotely.

10. An infinite adjust seat post comprising:
    an upper post;
    a lower post, said upper post telescopically engaging said lower post;
    a main piston coupled to said lower post, said main piston comprising:
        a first fluid pathway having first fluid port and a second fluid port;
    a fluid chamber enclosed within at least a first portion of said lower post, said main piston separating said fluid chamber into a first portion and a second portion;
    a gas chamber enclosed within at least a second portion of said lower post;
    an internal floating piston disposed between said fluid chamber and said gas chamber such that said internal floating piston separates said fluid chamber from said gas chamber;
    a spool valve slidably disposed at least partially within said main piston;

a pressure relief valve disposed at least partially within said main piston, wherein said pressure relief valve comprises a second fluid pathway through said main piston; and an actuation assembly disposed external to said seat post, said actuation assembly coupled to said lower post.

11. The infinite adjust seat post of claim 10, wherein said spool valve comprises:

a wall comprising at least one slider, said at least one slider configured for sliding within said main piston; and at least one seal extending from said wall, said at least one seal is disposed against an inner surface of said main piston to prevent fluid from flowing between said at least one seal and said inner surface of said main piston.

12. The infinite adjust seat post of claim 10, wherein said pressure relief valve comprises:

a spring;

a ball coupled to said spring; and an annular wall surrounding at least a portion of said ball, said pressure relief valve having a first position in which said ball has not sufficiently compressed said spring, and said second fluid pathway is closed, said pressure relief valve having a second position in which said ball has sufficiently compressed said spring, and said second fluid pathway is open.

13. The infinite adjust seat post of claim 10, further comprising:

an anti-rotation pin disposed between said upper post and said lower post, said anti-rotation pin maintaining an alignment between said upper post and said lower post such that said upper post and said lower post do not rotate with respect to each other.

14. The infinite adjust seat post of claim 10, wherein said first fluid pathway extends between said first portion of said fluid chamber and said second portion of said fluid chamber.

15. The infinite adjust seat post of claim 10, wherein said second fluid pathway extends between said first portion of said fluid chamber and said second portion of said fluid chamber.

16. The infinite adjust seat post of claim 10, further comprising:

a piston rod having a first end and a second end, said first end of said piston rod coupled to said main piston; and said actuation assembly coupled to said second end of said piston rod, said actuation assembly having first position in which said first end of said piston rod is pushed against said spool valve causing said spool valve to slide within said main piston.

17. The infinite adjust seat post of claim 16, wherein said actuation assembly is actuated by a mechanical lever.

18. The infinite adjust seat post of claim 16, wherein said actuation assembly is actuated remotely.

* * * * *